(12) United States Patent
Yabu (10) Patent No.: US 10,654,432 B2
(45) Date of Patent: May 19, 2020

(54) VEHICLE BUMPER DEVICE

(71) Applicant: HONDA MOTOR CO., LTD., Tokyo (JP)

(72) Inventor: Tomoya Yabu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 42 days.

(21) Appl. No.: 16/228,299

(22) Filed: Dec. 20, 2018

(65) Prior Publication Data

US 2019/0193656 A1 Jun. 27, 2019

(30) Foreign Application Priority Data

Dec. 26, 2017 (JP) ................. 2017-249764

(51) Int. Cl.
| | |
|---|---|
| *B60R 19/02* | (2006.01) |
| *B60R 19/03* | (2006.01) |
| *B60R 19/24* | (2006.01) |
| *B60R 19/18* | (2006.01) |

(52) U.S. Cl.
CPC ............ *B60R 19/023* (2013.01); *B60R 19/03* (2013.01); *B60R 19/18* (2013.01); *B60R 19/24* (2013.01); *B60R 2019/1806* (2013.01)

(58) Field of Classification Search
CPC ....... B60R 19/023; B60R 19/18; B60R 19/24; B60R 19/03; B60R 2019/1806; B60R 2019/186; B60R 19/02
USPC ........................................................ 293/120
See application file for complete search history.

(56) References Cited

U.S. PATENT DOCUMENTS

| | | | |
|---|---|---|---|
| 2016/0059810 A1* | 3/2016 | Watanabe ............... | B60R 19/24 293/133 |
| 2016/0121827 A1 | 5/2016 | Yabu et al. | |
| 2016/0355150 A1 | 12/2016 | Yabu et al. | |
| 2019/0185061 A1* | 6/2019 | Haga .................... | B62D 25/082 |

FOREIGN PATENT DOCUMENTS

| | | |
|---|---|---|
| JP | H02-175451 A | 7/1990 |
| JP | 2016-088148 A | 5/2016 |
| JP | 2017-001422 A | 1/2017 |

OTHER PUBLICATIONS

Japanese Office Action dated Jun. 18, 2019 (3 pages).

* cited by examiner

*Primary Examiner* — Pinel E Romain
(74) *Attorney, Agent, or Firm* — Rankin, Hill & Clark LLP (57) ABSTRACT

A vehicle bumper device includes: (i) a bumper beam formed of a continuous fiber reinforced plastic and including (a) a central portion that extends in a vehicle width direction and (b) a left-right pair of lateral portions that respectively extend from opposite ends of the central portion and curve toward a vehicle body; and (h) bumper auxiliary portions formed of a short fiber reinforced plastic different from the continuous fiber reinforced plastic and protruding respectively from the lateral portions outward in a vehicle front-rear direction. The lateral portions each have at least one ridgeline defined by a surface step formed on the upper surface section or the lower surface section. The ridgeline extends between the collision load receiving section and the vehicle body attachment section.

20 Claims, 6 Drawing Sheets

FIG. 4B

VEHICLE BUMPER DEVICE

CROSS-REFERENCE TO RELATED APPLICATIONS

The present application claims priority under 35 U.S.C. § 119 to Japanese Patent Application No. 2017-249764, filed Dec. 26, 2017, the contents of which are hereby incorporated by reference in their entirety.

TECHNICAL FIELD

The present invention relates to a vehicle bumper device.

BACKGROUND

There is known a vehicle bumper device to be mounted on a front or rear end of a vehicle, the vehicle bumper device having: (i) a bumper beam formed of a continuous fiber reinforced plastic and including (a) a central portion that extends in a vehicle width direction and (b) a left-right pair of lateral portions that extend from opposite ends of the central portion and curve toward a vehicle body of the vehicle; and (ii) a bumper auxiliary portions formed of a short fiber reinforced plastic and protruding respectively from the lateral portions outward in a vehicle front-rear direction (see, for example, Japanese Unexamined Patent Application Public Disclosure No. 2017-001422). Such a vehicle bumper device, which is made up of the bumper beam formed of the continuous fiber reinforced plastic and the bumper auxiliary portions formed of the short fiber reinforced plastic, allows both absorbing impact energy and reducing the weight and cost of the vehicle bumper device.

SUMMARY

Problems to be Solved by the Invention

As the lateral portions of the bumper beam are formed in a curved shape, in comparison with the central portion, a random cross-sectional deformation is likely to occur in the lateral portions when a collision load is inputted to the lateral portions, and the load bearing capacity of the bumper beam tends to be reduced.

It is an object of the present invention to control cross-sectional deformation in lateral portions of a bumper beam to inhibit reduction of the load bearing capacity of the bumper beam.

Solution to the Problem

To solve the above-described problem, the present invention provides a vehicle bumper device for a vehicle, the vehicle bumper device including: (i) a bumper beam formed of a continuous fiber reinforced plastic and including (a) a central portion that extends in a vehicle width direction and (b) a left-right pair of lateral portions that respectively extend from opposite ends of the central portion and curve toward a vehicle body of the vehicle; and (ii) bumper auxiliary portions formed of a short fiber reinforced plastic different from the continuous fiber reinforced plastic and protruding respectively from the lateral portions outward in a vehicle front-rear direction. The bumper beam defines: an upper surface section; a lower surface section; a collision load receiving section that faces outward in the vehicle front-rear direction; and a vehicle body attachment section that has an opening oriented toward the vehicle body, and has an approximately U-shaped cross section. In the lateral portions, at least one of the upper surface section and the lower surface section has at least one ridgeline defined by a surface step formed on the at least one of the upper surface and the lower surface. The at least one ridgeline extends between the collision load receiving section and the vehicle body attachment section.

Effects of the Invention

According to the present invention, cross-sectional deformation in the lateral portions of the bumper beam can be easily controlled to inhibit reduction of the load bearing capacity of the lateral portions.

DESCRIPTION OF EMBODIMENTS

Hereinafter, a description will be given of a rear bumper device of a vehicle to which the present invention has been applied. It should be noted that the present invention can be applied to a front bumper device of a vehicle.

Figure 1:
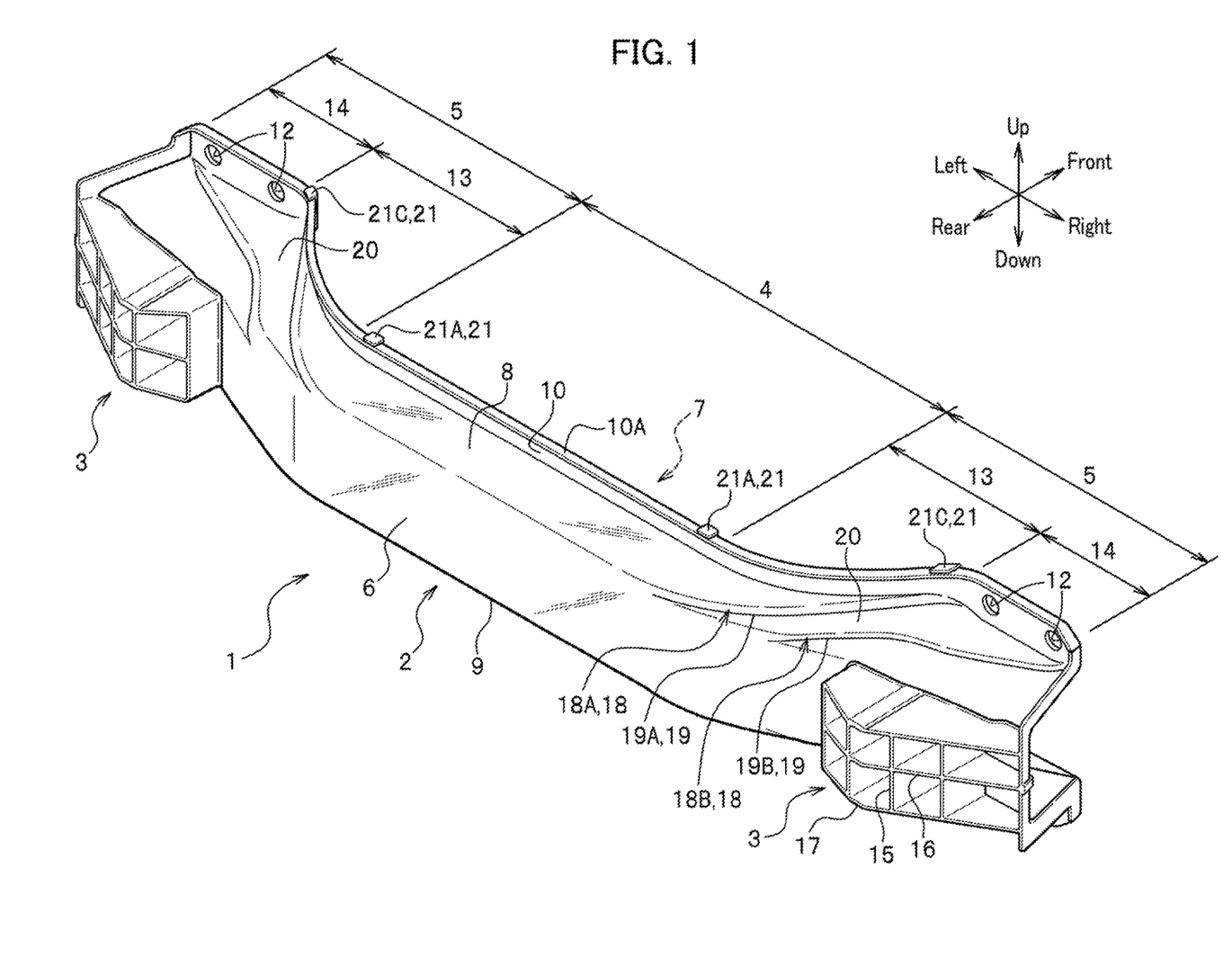
FIG. 1 is a perspective view of a vehicle bumper device according to the present invention.
Figure 2:
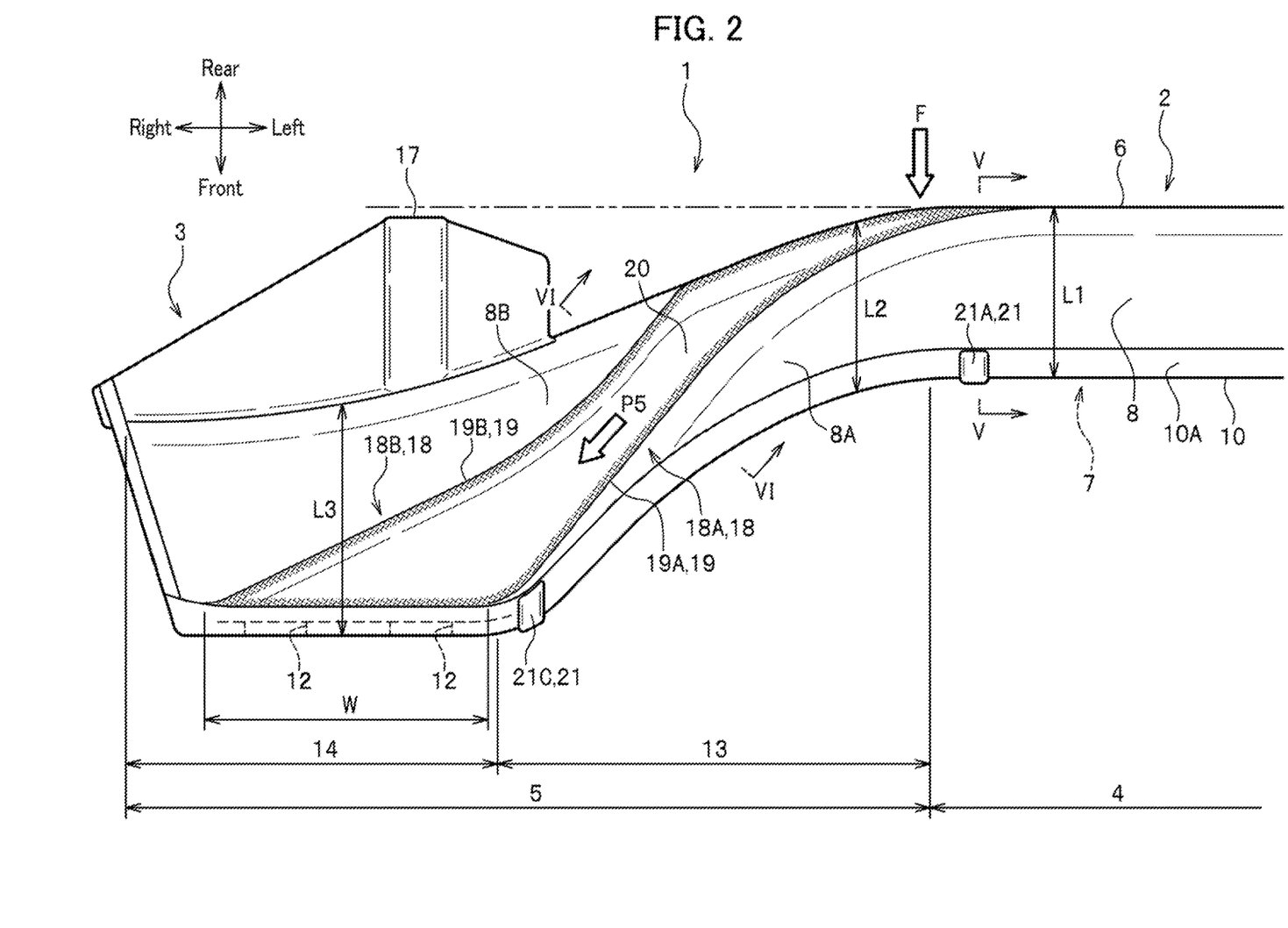
FIG. 2 is a partial plan view of the vehicle bumper device according to the present invention.
Figure 3:
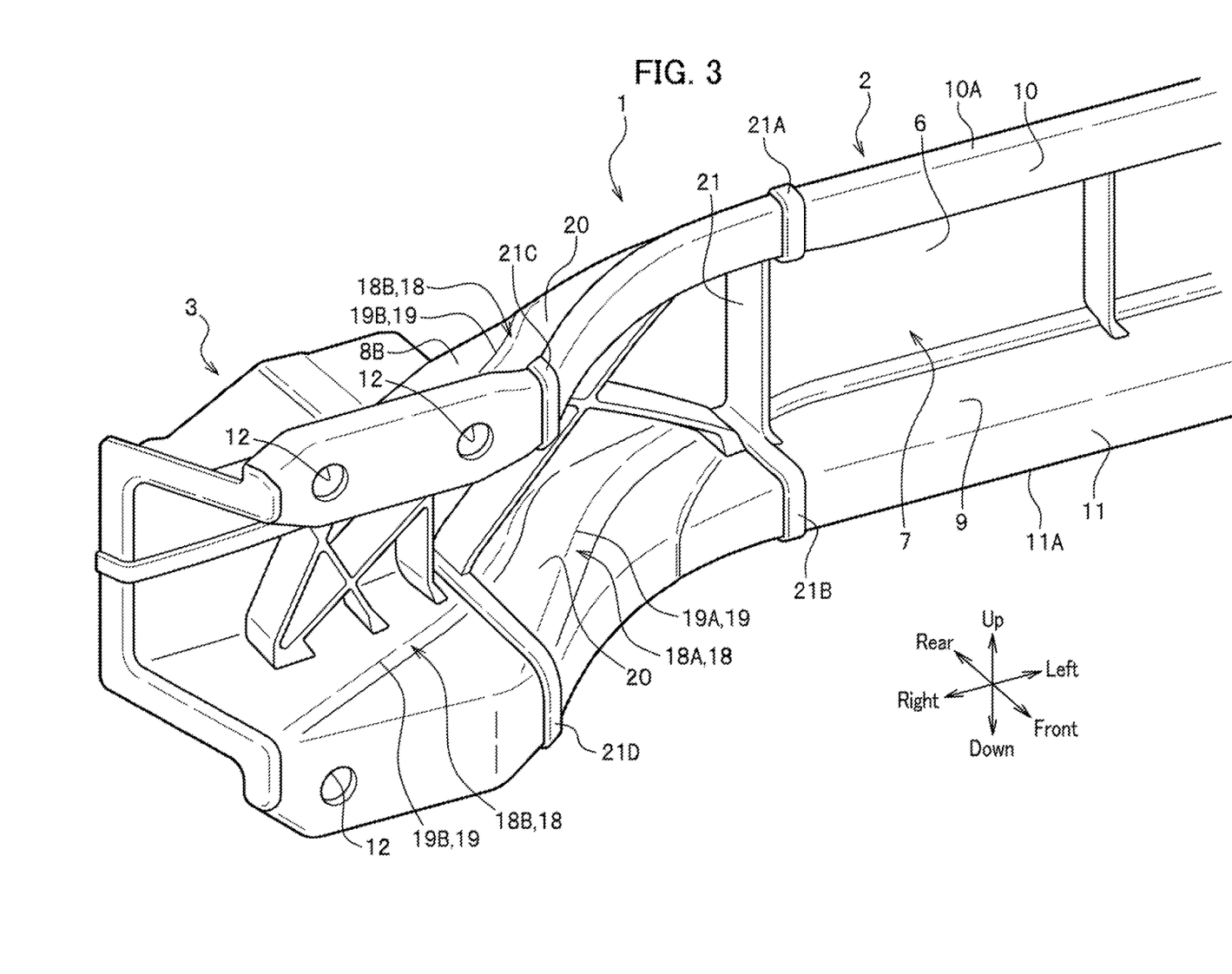
FIG. 3 is a perspective view showing a lateral portion and its surrounding portions of the vehicle bumper device according to the present invention, as seen from the front side of the vehicle.
Figure 4A:
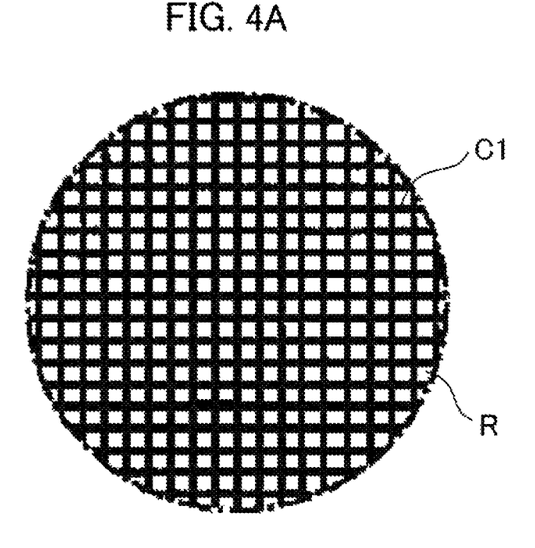
FIG. 4A is a schematically enlarged view illustrating the configuration of a continuous fiber reinforced plastic.
Figure 4B:
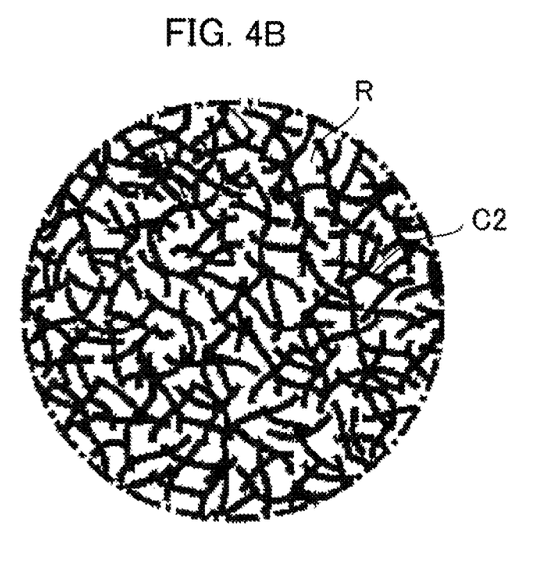
FIG. 4B is a schematically enlarged view illustrating the configuration of a short fiber reinforced plastic.

Referring to FIGS. 1 to 3, a vehicle bumper device 1 includes a bumper beam 2 and bumper auxiliary portions 3. The bumper beam 2 is formed of a continuous fiber reinforced plastic. The continuous fiber reinforced plastic is, for example, a thermoplastic carbon fiber reinforced plastic (CFRP). As illustrated in FIG. 4A, the continuous fiber reinforced plastic includes thermoplastic resin R formed in a matrix form and carbon fibers C1 of long fibers. The carbon fibers C1 are regularly oriented. In contrast, the bumper auxiliary portions 3 described later in details are formed of a short fiber reinforced plastic. As illustrated in FIG. 4B, the short fiber reinforced plastic includes thermoplastic resin R and carbon fibers C2 of short fibers. The short fibers C2 are irregularly oriented.

The bumper beam 2 formed of the continuous fiber reinforced plastic and the bumper auxiliary portions 3 formed of the short fiber reinforced plastic, shown in FIGS. 1 to 3, can be easily formed integrally with each other by two color molding using injection molding. Specifically, the bumper auxiliary portions 3 can be formed integrally with the bumper beam 2 by setting a single-piece molded bumper beam 2 in a mold and injecting short fiber reinforced plastic into cavities of the mold.

The bumper beam 2 has a central portion 4 that extends in a vehicle width direction and a left-right pair of lateral portions 5 that extend from opposite ends of the central portion 4 and curve toward a vehicle body not shown, i.e., curve forward in a vehicle front-rear direction. The bumper beam 2 defines a collision load receiving section 6, a vehicle body attachment section 7, an upper surface section 8, and a lower surface section 9. These elements 6, 7, 8 and 9 together define an approximately U-shaped vertical cross section over the entire length of the bumper beam 2, though there are some differences in size or the like between the central portion 4 and the lateral portions 5. The opening of this U shape is oriented in a horizontal direction.

The collision load receiving section 6 is formed as a substantially vertical surface located on an outer side of the bumper beam 2 in the vehicle front-rear direction. In the present embodiment, the collision load receiving section 6 is located on the rear side of the bumper beam 2 in the vehicle front-rear direction. The vehicle body attachment section 7 has an opening oriented toward a rear end of the vehicle body and has a flange 10 that extends upward from an upper edge of the opening and a flange 11 that extends downward from a lower edge of the opening. In a later-described outer end portion 14 of each of the lateral portions 5, the upper flange 10 has a left-right pair of bolt through-holes 12, through each of which a bolt for attaching the bumper beam 2 to the vehicle body is inserted. The lower flange 11 also has one bolt through-hole 12 similar to those in the upper flange 10.

Figure 5:
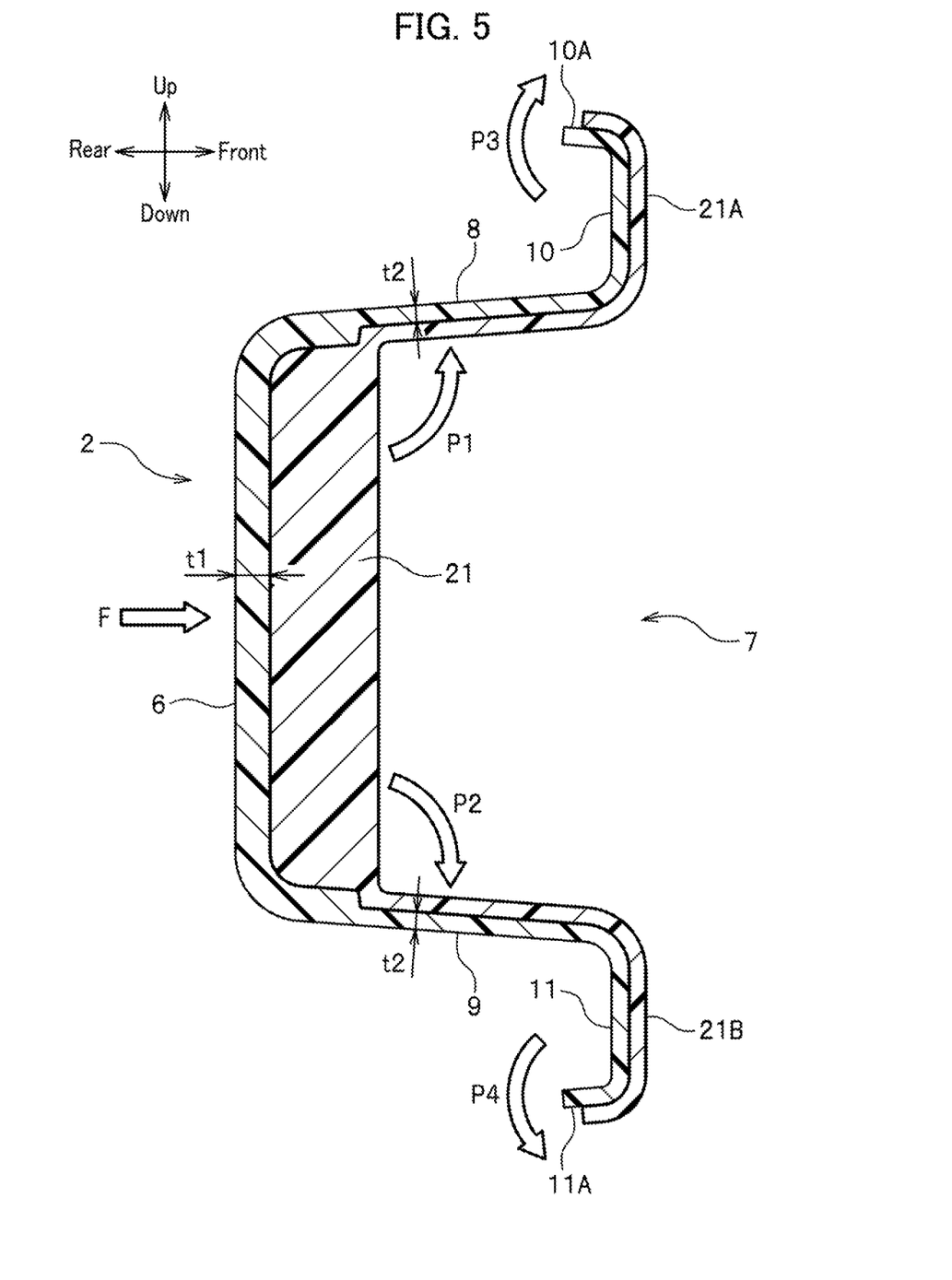
FIG. 5 is a cross-sectional view showing a cross section taken along line V-V in FIG. 2.

As shown in FIG. 5, the upper surface section 8 is formed as a slightly sloped surface section that slopes slightly upward as it extends from the collision load receiving section 6 toward the vehicle body attachment section 7. The lower surface section 9 is formed as a slightly sloped surface section that slopes slightly downward as it extends from the collision load receiving section 6 toward the vehicle body attachment section 7. Regarding the central portion 4, the collision load receiving section 6 has a thickness t1 that is larger than a thickness t2 of the upper surface section 8 and the lower surface section 9. Desirably, the portion having the thickness t1 extends over the collision load receiving section 6, over a corner portion between the collision load receiving section 6 and the upper surface section 8, and over a corner portion between the collision load receiving section 6 and the lower surface section 9.

As shown in FIGS. 1 and 2, the lateral portions 5 each include a curved portion 13 and the outer end portion 14. As shown in FIG. 2, each curved portion 13 curves from a corresponding end portion of the central portion 4 toward the front side of the vehicle, keeping substantially the same front-rear dimension as a front-rear width dimension L1 of the central portion 4, and then extends outward in the vehicle width direction with a gradually increasing front-rear width dimension L2. The outer end portion 14 extends from a corresponding end portion of the curved portion 13 outward in the vehicle width direction with a gradually decreasing front-rear width dimension L3. The vehicle body attachment section 7 in the curved portion 13 is formed in a curved shape such that the vehicle body attachment section 7 extends forward as it extends outward in the vehicle width direction. In contrast, the vehicle body attachment section 7 in the outer end portion 14 is formed in a linear shape extending substantially in the vehicle width direction.

Referring to FIG. 1, each of the bumper auxiliary portions 3 is formed on a rear surface (collision load receiving section 6) of corresponding one of the outer end portions 14 so that the bumper auxiliary portion 3 protrudes rearward in the vehicle front-rear direction. In the present embodiment, each of the bumper auxiliary portions 3 protrudes toward the rear side of the vehicle. As described above, the bumper auxiliary portions 3 are formed integrally with the bumper beam 2.

The bumper auxiliary portions 3 each have a honeycomb structure in which rear open-ended box spaces defined by vertical ribs 15 and horizontal ribs 16 are arranged vertically and horizontally, as viewed in the vehicle front-rear direction. As shown in FIG. 2, each of the bumper auxiliary portions 3 has a rear surface that includes: an inner region that extends from a vehicle width direction inner end of the bumper auxiliary portion 3 outward in the vehicle width direction to a rearmost end portion 17 of the bumper auxiliary portion 3; and an outer region that extends from the rearmost end portion 17 in the vehicle width direction toward an outer end of the bumper auxiliary portion 3. The inner region extends rearward from the inner end as it extends outward in the vehicle width direction. The outer region extends forward from the rearmost end portion 17 as it extends outward in the vehicle width direction. The rearmost end portion 17 is located slightly in front relative to the collision load receiving section 6 in the central portion 4 of the bumper beam 2.

As shown in FIG. 3, the bumper beam 2 has an inner surface (surface hidden from the outside) on which ribs 21 formed of the short fiber reinforced plastic are disposed to inhibit deformation of the bumper beam 2. As described above, the bumper auxiliary portions 3 can be easily formed by injection molding. The ribs 21 can also be formed at the same time as when the bumper auxiliary portions 3 are formed by injection molding, by forming injection flow channels and cavities for the ribs 21 in the molds.

For example, as shown in FIG. 5, the ribs 21 are formed over the entire inner surface of the bumper beam 2 so that end portions of each of the ribs 21 reach an upper end of the flange 10 and a lower end of the flange 11. The flange 10 has an upper end portion where the flange 10 is bent rearward to form a flange end portion 10A. The flange 11 has a lower end portion where the flange 11 is bent rearward to form a flange end portion 11A. An upper portion of each rib 21 is formed to extend upward from a lower end portion of the flange 10, following along the flange 10 and reaching the flange end portion 10A. A lower portion of the rib 21 is formed to extend downward from an upper end portion of the flange 11, following along the flange 11 and reaching the flange end portion 11A. As shown in FIG. 1, ribs 21A are formed on the flange 10 in the vicinities of opposite end portions of the central portion 4. Similarly, ribs 21B (see FIG. 3) are formed on the flange 11. As shown in FIG. 1, a rib 21C is formed on the flange 10 in each curved portion 13 in the vicinity of an outer end portion thereof located outermost in the vehicle width direction. Similarly, ribs 21D (see FIG. 3) are formed on the flange 11.

Referring to FIGS. 1 to 3 and 6, each surface of the upper surface section 8 and the lower surface section 9 in each lateral portion 5 has surface steps 18 that define ridgelines 19 extending between the collision load receiving section 6 and the vehicle body attachment section 7. Depending on circumstances, the ridgelines 19 may be provided solely on the surface of the upper surface section 8 or solely on the surface of the lower surface section 9. In the present embodiment, as shown in FIG. 2, a pair of steps 18A and 18B are formed to be spaced apart in the vehicle width direction to define a pair of ridgelines 19A and 19B. The surface of the upper surface section 8 and the surface of the lower surface section 9 each define a ridgeline-defined section 20 (region surrounded by shaded lines in FIG. 2) surrounded by the pair of ridgelines 19A and 19B, the collision load receiving section 6, and the vehicle body attachment section 7. The ridgeline-defined section 20 is not limited to a flat surface and may have some twisted or curved portions as long as the ridgeline-defined section 20 extends smoothly as a whole.

On the surface of the upper surface section 8, one end of the ridgeline 19A is located at a portion of the collision load receiving section 6 that is located in the vicinity of a vehicle width direction inner end of the curved portion 13. The ridgeline 19A extends from the one end to traverse the curved portion 13 obliquely. The other end of the ridgeline 19A is located at a portion of the vehicle body attachment section 7 that is located in the vicinity of a vehicle width direction outer end of the curved portion 13. One end of the other ridgeline 19B is located at a portion of the collision load receiving section 6 that is located substantially central to a vehicle width direction length of the curved portion 13. The ridgeline 19B extends from the one end to traverse the curved portion 13 and the outer end portion 14 obliquely. The other end of the ridgeline 19B is located at a portion of the vehicle body attachment section 7 that is located in the vicinity of a vehicle width direction outer end of the outer end portion 14. With this structure, the ridgeline-defined section 20 extends forward as it extends outward in the vehicle width direction, from a portion of the collision load receiving section 6 that is located on a vehicle width direction inner side of the curved portion 13. The ridgeline-defined section 20 extends over a substantially entire length of the outer end portion in the vehicle body attachment section 7. Thus, the above-described bolt through-holes 12 are located within a vehicle width direction width W of the ridgeline-defined section 20 in the vehicle body attachment section 7.

Figure 6:
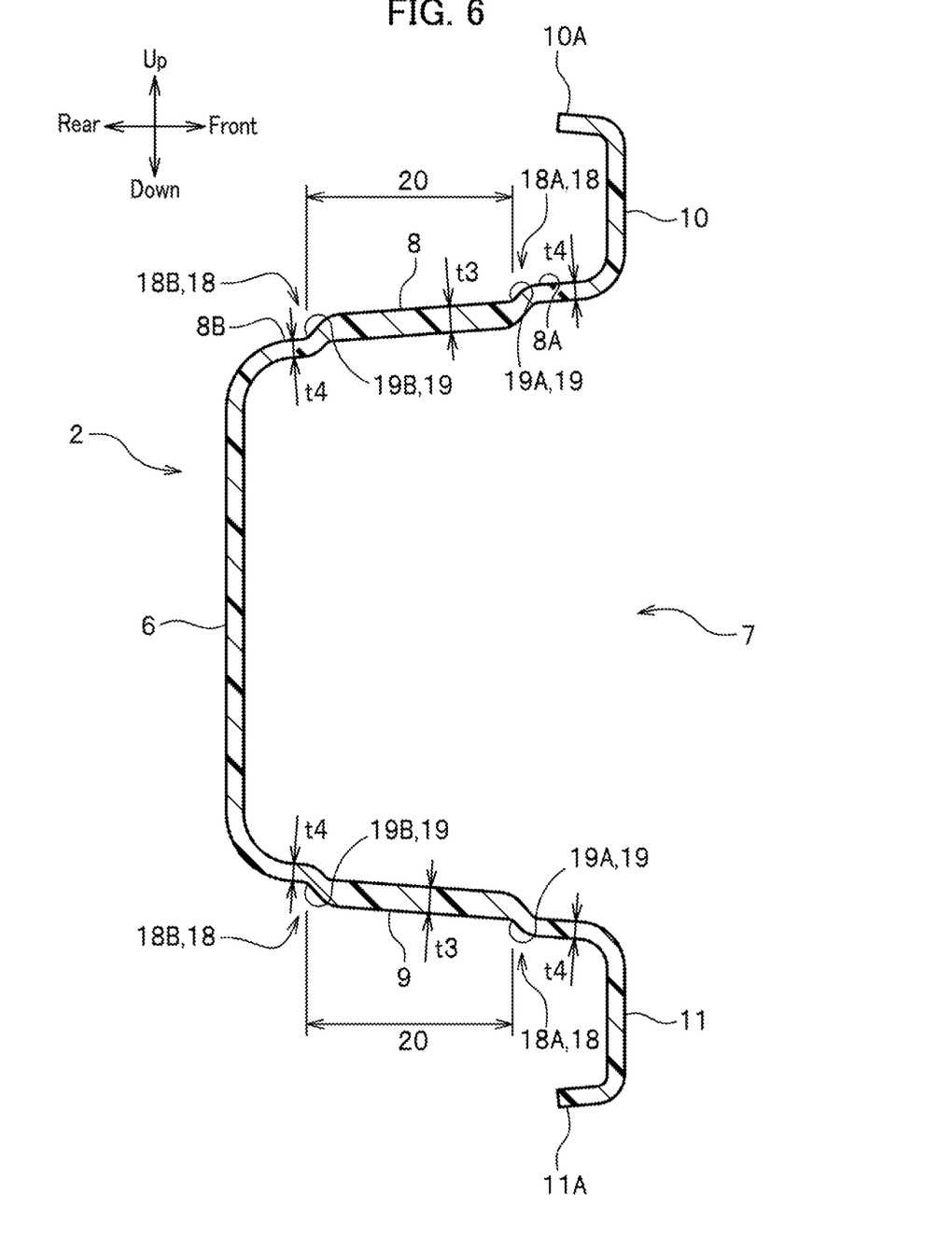
FIG. 6 is a cross-sectional view showing a cross section taken along line VI-VI in FIG. 2.

As shown in FIG. 6, the ridgeline-defined section 20 is formed to be lower than an upper surface section 8A that is located on the other side of the step 18A defining the ridgeline 19A, and is formed to be upper than an upper surface section 8B that is located on the other side of the step 18B defining the ridgeline 19B. The ridgeline-defined section 20 has a plate thickness t3 which is larger than a plate thickness t4 of the upper surface sections 8A and 8B, which are located adjacent to the ridgeline-defined section 20. As the ridgelines 19A and 19B formed on the lower surface section 9 are symmetrical to the ridgelines 19A and 19B formed on the upper surface section 8 with respect to a horizontal plane extending between the upper surface section 8 and the lower surface section 9, descriptions thereof are omitted.

Working and Advantageous Effects of the Embodiment

Referring to FIG. 2, when the collision load receiving section 6 in the central portion 4 of the bumper beam 2 receives a collision load F in the event of a full-flat collision or the like, the bumper beam 2 effectively collapses and absorbs the collision energy because the bumper beam 2 is formed of the continuous fiber reinforced plastic having high strength. Thus, the absorption of the collision energy inhibits deformation of the vehicle body that supports the bumper beam 2. When a relatively large collision load F generated in the event of a full-flat collision or the like is inputted to the bumper beam 2, the collision load F is first received by the collision load receiving section 6 in the central portion 4, causing the central portion 4 to collapse and causing the collision load receiving section 6 to be displaced forward. This forward displacement of the collision load receiving section 6 in the central portion 4 causes the collision load F to be inputted also to rear surfaces of the bumper auxiliary portions 3. As a result, the collision energy is effectively absorbed by the collapse of the bumper beam 2 and the bumper auxiliary portions 3.

In a case of a relatively small collision load inputted obliquely from behind when the vehicle is traveling at a low speed, such as in the event of a collision that occurs in switching the direction of the vehicle in entering or leaving a parking space, the collision energy can be effectively absorbed solely by the bumper auxiliary portions 3. The bumper device thus structured with the bumper beam 2 formed of the continuous fiber reinforced plastic and the bumper auxiliary portions 3 formed of the short fiber reinforced plastic allows for both the absorption of impact energy and the reduction of the weight and/or cost.

When a relatively large collision load F generated in the event of a full-flat collision or the like is inputted to the central portion 4, the energy of the collision is also distributed to the lateral portions 5. As the lateral portions 5 are each formed in a curved shape, cross-sectional deformation different from predetermined collapse deformation may possibly occur in the lateral portions 5. Taking this into account, in the present embodiment, each of the upper surface section 8 and the lower surface section 9 of each lateral portion 5 has surface steps 18 that define ridgelines 19 extending between the collision load receiving section 6 and the vehicle body attachment section 7. This structure establishes a load transmission path (indicated by arrow P5 in FIG. 2) along the ridgelines 19 between the collision load receiving section 6 and the vehicle body attachment section 7. The load transmission path inhibits random cross-sectional deformation of each lateral portion 5 and allows the lateral portion 5 to be deformed in a desired shape.

The ridgeline-defined section 20 surrounded by the ridgelines 19A and 19B, the collision load receiving section 6, and the vehicle body attachment section 7 constitutes the load transmission path that can receive most of the load. This structure improves the load bearing capacity of the lateral portion 5. As shown FIG. 6, as the plate thickness t3 of the ridgeline-defined section 20 is larger than the plate thickness t4 of those portions surrounding the ridgeline-defined section 20, ridgeline-defined section 20 is more rigid than those surrounding portions. Thus, this structure improves the load bearing capacity of the lateral portion 5. By making only the load transmission path highly rigid, it becomes unnecessary to increase the weight of portions surrounding the load transmission path. In the vehicle body attachment section 7, as shown in FIG. 2, the bolt through-holes 12 are located within the vehicle width direction width W of the ridgeline-defined section 20. Thus, the load transmitted through the ridgeline-defined section 20 can be effectively received by high-strength bolt fastening portions.

When the collision load F is applied to the collision load receiving section 6 in the central portion 4, the bumper beam 2 is applied with a force causing the bumper beam 2 to be deformed in the directions indicated by the arrows P1 and P2 in FIG. 5. In this event, a compression stress is applied to a compression region of the bumper beam 2 located on the collision load receiving section 6 side of vehicle front-rear direction central portions of the upper surface section 8 and the lower surface section 9; and a tensile stress is applied to tension regions of the bumper beam 2 located on the vehicle body attachment section 7 side of the vehicle front-rear direction central portions of the upper surface section 8 and the lower surface section 9. On the compression region side, the compression stress is likely to cause a decrease in the strength of the collision load receiving section 6 and/or cause buckling in corner portions (a corner portion between the collision load receiving section 6 and the upper surface section 8, and a corner portion between the collision load receiving section 6 and the lower surface section 9). However, as the thickness t1 of the collision load receiving section 6 in the central portion 4 is larger than the thickness t2 of the upper surface section 8 and the lower surface section 9, the decrease in the strength of the collision load receiving section 6 and the buckling of the corner portions are inhibited.

Moreover, when a collision load F is applied to the collision load receiving section 6, the flanges 10 and 11 located in the tension region is applied with a force in such a manner that the force causes the flanges 10 and 11 to be deformed in the directions indicated by the arrows P3 and P4 in FIG. 5. As a result, the force operates on the bumper beam 2 in such a manner as to widen the opening of the U-shaped cross section of the bumper beam 2. This may possibly lead to a reduction in the section modulus of the bumper beam 2. That is, it may possibly reduce the rigidity of the bumper beam 2. However, as the ribs 21 inhibit deformation of the bumper beam 2, the opening in the cross-sectional shape of the bumper beam 2 is inhibited from being widened. Thus, the ribs 21 inhibit reduction of the rigidity of the bumper beam 2.

As described above, a vehicle bumper device 1 according to the present embodiment includes: (i) a bumper beam 2 formed of a continuous fiber reinforced plastic and including (a) a central portion 4 that extends in a vehicle width direction and (b) a left-right pair of lateral portions 5 that respectively extend from opposite ends of the central portion 4 and curve toward a body of the vehicle; and (ii) a bumper auxiliary portions 3 formed of a short fiber reinforced plastic different from the continuous fiber reinforced plastic and protruding respectively from the lateral portions 5 outward in a vehicle front-rear direction. The bumper beam 2 defines: an upper surface section 8, a lower surface section 9, a collision load receiving section 6 that faces outward in the vehicle front-rear direction, and a vehicle body attachment section 7 that has an opening oriented toward the vehicle body, and has an approximately U-shaped cross section having the opening oriented in a horizontal direction. At least one of the upper surface section 8 and the lower surface section 9 has at least one ridgeline 19 defined by a surface step 18 formed on the at least one of the upper surface section 8 and the lower surface section 9, in the lateral portions 5. The at least one ridgeline 19 extends between the collision load receiving section 6 and the vehicle body attachment section 7. This structure of the vehicle bumper device 1 has the following advantages. In each lateral portion 5, a load transmission path is established between the collision load receiving section 6 and the vehicle body attachment section 7 along the at least one ridgeline 19. This load transmission path inhibits random cross-sectional deformation of the lateral portion 5.

A plurality of ridgelines 19 are formed to be spaced apart each other in the vehicle width direction so that a ridgeline-defined section 20 surrounded by a pair of ridgelines 19A and 19B, the collision load receiving section 6, and the vehicle body attachment section 7 is formed. This structure allows the ridgeline-defined section 20 to constitute a load transmission path that can receive most of the load, leading to an improvement of the load bearing capacity of the lateral portion 5.

In the vehicle body attachment section 7, bolt fastening portions (bolt through-holes 12) are formed within the vehicle width direction width W of the ridgeline-defined section 20. With this configuration, the load transmitted through the ridgeline-defined section 20 can be effectively received by the bolt fastening portions.

The plate thickness t3 of the ridgeline-defined section 20 is made larger than the plate thickness t4 of portions of the upper surface section 8 or lower surface section 9 that are located adjacent to the ridgeline-defined section 20. With this configuration, the ridgeline-defined section 20 is more rigid than those portions. As a result, the load bearing capacity of the lateral portion 5 can be improved. By making only the load transmission path highly rigid, it becomes unnecessary to increase the weight of portions of the upper surface section 8 or lower surface section 9 that are located adjacent to the load transmission path.

A plate thickness t1 of the collision load receiving section 6 in the central portion 4 is made larger than a plate thickness t2 of a portion of the upper surface section 8 or the lower surface section 9 that is located adjacent to the collision load receiving section 6. This structure can inhibit reduction of the strength of the collision load receiving section 6.

The bumper beam 2 may be provided with a rib 21 formed of short fiber reinforced plastic, to inhibit deformation of the bumper beam 2. This structure can inhibit deformation of the bumper beam 2. As a result, the opening in the cross-sectional shape of the bumper beam 2 is inhibited from being widened. Thus, this structure can inhibit decrease in the rigidity of the bumper beam 2.

What is claimed is:

1. A vehicle bumper device for a vehicle, the vehicle bumper device comprising:
   (i) a bumper beam formed of a continuous fiber reinforced plastic and comprising
      (a) a central portion that extends in a vehicle width direction, the central portion having opposite ends in the vehicle width direction, and
      (b) a left-right pair of lateral portions that respectively extend from the opposite ends of the central portion and curve toward a vehicle body of the vehicle; and
   (ii) bumper auxiliary portions formed of a short fiber reinforced plastic different from the continuous fiber reinforced plastic and protruding respectively from the lateral portions outward in a vehicle front-rear direction,
   wherein the bumper beam defines: an upper surface section, a lower surface section, a collision load receiving section that faces outward in the vehicle front-rear direction, and a vehicle body attachment section that has an opening oriented toward the vehicle body, and has an approximately U-shaped cross section, and
   wherein, in the lateral portions, at least one of the upper surface section and the lower surface section has at least one ridgeline defined by a surface step formed on the at least one of the upper surface and the lower surface, the at least one ridgeline extending between the collision load receiving section and the vehicle body attachment section.

2. The vehicle bumper device according to claim 1,
   wherein the at least one ridgeline comprises a plurality of ridgelines spaced apart from each other in the vehicle width direction, and
   wherein the at least one of the upper surface and the lower surface comprises a ridgeline-defined section surrounded by two of the plurality of ridgelines, the collision load receiving section, and the vehicle body attachment section.

3. The vehicle bumper device according to claim 2,
wherein the vehicle body attachment section comprises a bolt fastening portion located within a width of the ridgeline-defined section in the vehicle width direction.

4. The vehicle bumper device according to claim 2,
wherein the at least one of the upper surface section and the lower surface section has a portion located adjacent to the ridgeline-defined section and having a plate thickness which is smaller than a plate thickness of the ridgeline-defined section.

5. The vehicle bumper device according to claim 3,
wherein the at least one of the upper surface section and the lower surface section has a portion located adjacent to the ridgeline-defined section and having a plate thickness which is smaller than a plate thickness of the ridgeline-defined section.

6. The vehicle bumper device according to claim 1,
wherein the collision load receiving section has a first portion located in the central portion and having a first plate thickness,
the upper surface section or the lower surface section has a second portion located adjacent to the first portion and having a second plate thickness, and
the first plate thickness is larger than the second plate thickness.

7. The vehicle bumper device according to claim 2,
wherein the collision load receiving section has a first portion located in the central portion and having a first plate thickness,
the upper surface section or the lower surface section has a second portion located adjacent to the first portion and having a second plate thickness, and
the first plate thickness is larger than the second plate thickness.

8. The vehicle bumper device according to claim 3,
wherein the collision load receiving section has a first portion located in the central portion and having a first plate thickness,
the upper surface section or the lower surface section has a second portion located adjacent to the first portion and having a second plate thickness, and
the first plate thickness is larger than the second plate thickness.

9. The vehicle bumper device according to claim 4,
wherein the collision load receiving section has a first portion located in the central portion and having a first plate thickness,
the upper surface section or the lower surface section has a second portion located adjacent to the first portion and having a second plate thickness, and
the first plate thickness is larger than the second plate thickness.

10. The vehicle bumper device according to claim 5,
wherein the collision load receiving section has a first portion located in the central portion and having a first plate thickness,
the upper surface section or the lower surface section has a second portion located adjacent to the first portion and having a second plate thickness, and
the first plate thickness is larger than the second plate thickness.

11. The vehicle bumper device according to claim 1,
wherein the bumper beam has an inner surface on which a rib for reinforcing the bumper beam is disposed, the rib being formed of the short fiber reinforced plastic.

12. The vehicle bumper device according to claim 2,
wherein the bumper beam has an inner surface on which a rib for reinforcing the bumper beam is disposed, the rib being formed of the short fiber reinforced plastic.

13. The vehicle bumper device according to claim 3,
wherein the bumper beam has an inner surface on which a rib for reinforcing the bumper beam is disposed, the rib being formed of the short fiber reinforced plastic.

14. The vehicle bumper device according to claim 4,
wherein the bumper beam has an inner surface on which a rib for reinforcing the bumper beam is disposed, the rib being formed of the short fiber reinforced plastic.

15. The vehicle bumper device according to claim 5,
wherein the bumper beam has an inner surface on which a rib for reinforcing the bumper beam is disposed, the rib being formed of the short fiber reinforced plastic.

16. The vehicle bumper device according to claim 6,
wherein the bumper beam has an inner surface on which a rib for reinforcing the bumper beam is disposed, the rib being formed of the short fiber reinforced plastic.

17. The vehicle bumper device according to claim 7,
wherein the bumper beam has an inner surface on which a rib for reinforcing the bumper beam is disposed, the rib being formed of the short fiber reinforced plastic.

18. The vehicle bumper device according to claim 8,
wherein the bumper beam has an inner surface on which a rib for reinforcing the bumper beam is disposed, the rib being formed of the short fiber reinforced plastic.

19. The vehicle bumper device according to claim 9,
wherein the bumper beam has an inner surface on which a rib for reinforcing the bumper beam is disposed, the rib being formed of the short fiber reinforced plastic.

20. The vehicle bumper device according to claim 10,
wherein the bumper beam has an inner surface on which a rib for reinforcing the bumper beam is disposed, the rib being formed of the short fiber reinforced plastic.

* * * * *